United States Patent
Alexander et al.

[15] 3,695,737
[45] Oct. 3, 1972

[54] RESILIENT MOUNTING FOR TRACK ROLLERS

[72] Inventors: George F. Alexander, Pekin; Orville E. Kessinger, Jr., Mackinaw; John R. Rediger, Washington; Harold L. Reinsma, Dunlap, all of Ill.

[73] Assignee: Caterpillar Tractor Co., Peoria, Ill.

[22] Filed: Sept. 2, 1970

[21] Appl. No.: 69,028

[52] U.S. Cl. ................................. 305/27, 267/63
[51] Int. Cl. ............................................ B62d 55/16
[58] Field of Search ..305/27, 28; 280/104.5; 267/63; 105/197 A

[56] References Cited

UNITED STATES PATENTS 3,484,139  12/1969  Danner........................305/27
2,287,575  6/1942  Sensenich..............105/197 A
1,443,556  1/1923  Beal........................305/27 X
3,336,087  8/1967  Reinsma......................305/27
2,775,492  12/1956  Wirkkala......................305/28
2,360,619  10/1944  Peterman..................267/63 R Primary Examiner—Richard J. Johnson
Attorney—Fryer, Tjensvold, Feix, Phillips & Lempio

[57] ABSTRACT

An arrangement for resiliently mounting track rollers to the track roller frame of a tractor or other track laying vehicle wherein preloaded resilient pads are employed to provide a firm mounting under normal conditions while deflecting under shock loads to dampen shock load vibrations. The mounting permits independent removal of each roller without disturbing its preload condition.

6 Claims, 3 Drawing Figures

PATENTED OCT 3 1972

INVENTORS
GEORGE F. ALEXANDER
ORVILLE E. KESSINGER, JR.
JOHN R. REDIGER
HAROLD L. REINSMA

BY
Fryer, Tjensvold, Feix, Phillips & Lempio
ATTORNEYS

RESILIENT MOUNTING FOR TRACK ROLLERS

BACKGROUND OF THE INVENTION

While operating in rock at either slow or high speeds, the track rollers of a tractor, or the like, realize high shock loads which shorten tractor service life as well as give the operator a rough ride. In an effort to improve service life and the suspension characteristics of a tractor, considerable work has been done in the field of resiliently mounted track rollers.

Most resilient mounting designs have involved the use of rubber bushings to support the track rollers, idlers, and sprocket rims. However, such resilient means have generally proven unsatisfactory due to either insufficient or excessive freedom of deflection under shock loads. Various other mounting designs have made use of resilient mounting pads to provide a floating suspension of the track rollers. However, such pad type of mountings have heretofore suffered from various limitations and disadvantages, primarily due to lack of a means of successfully loading the resilient pad members in both compression and shear. Further, with previous designs it has not been possible to remove an individual track roller for servicing, or the like, without disturbing its own as well as adjacent roller preload conditions.

SUMMARY OF THE INVENTION

The general object of the present invention is to provide a mounting wherein resilient rubber pads preloaded in compression and shear resiliently mount individual track rollers of a track laying vehicle to provide a floating action and dampen shock loads imparted to the roller assembly, thereby increasing the life of each roller, roller shaft, and associated bearings. The mounting further serves to improve the ride characteristics and dampen vibrations to thereby improve the durability of the entire vehicle. In accordance with an important feature of the mounting, removal of individual rollers for service or replacement may be accomplished without disturbing other rollers or the preload condition of the mounting.

In the accomplishment of the foregoing and other objects and advantages, a mounting in accordance with the present invention generally includes a plurality of longitudinally spaced resilient track roller assemblies secured in a longitudinally extending track roller frame. Each assembly comprises a pair of oppositely inclined support plates secured transversely between side plates of the frame to define a bottom opening roller support housing for receiving a support yoke including parallel spaced wedge shaped side members and interconnecting bridge plate.

Two pairs of resilient shear and compression pads are secured to the support plates adjacent the opposite side edges thereof to bear against the inclined edges of the yoke side members upon insertion into the housing, and a resilient compression pad secured to the yoke bridge plate bears against the top plate of the frame.

Retaining plates bolted to the base ends of the support plates act against the base ends of the yoke side members and upon tightening of the bolts draw the yoke into assembled position against the pads, thereby preloading the latter in shear and compression. A roller is journalled between the base ends of the yoke side members and locked in place by means of caps removably secured thereto. Thus, the preloaded pads of each assembly resiliently support the yoke, and therefore the roller thereof, and the roller may be removed from the assembly without disturbing the preload condition by removing the caps to release the roller from the yoke.

DETAILED DESCRIPTION OF THE PREFERRED EMBODIMENT

Figure 1:
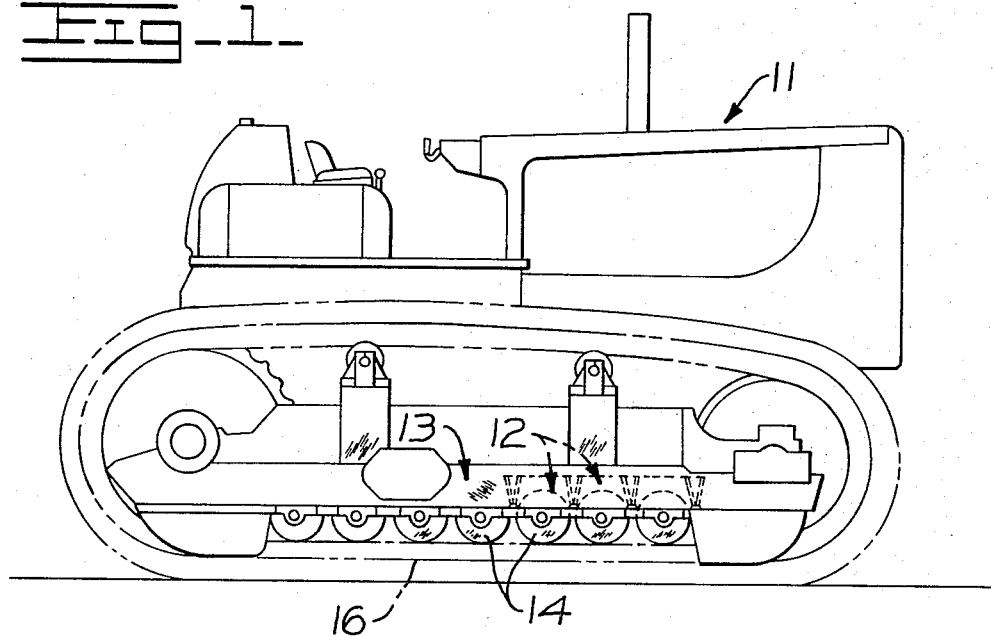
FIG. 1 is a side elevation view of a tractor embodying the resilient track roller mounting of the present invention.
Figure 2:
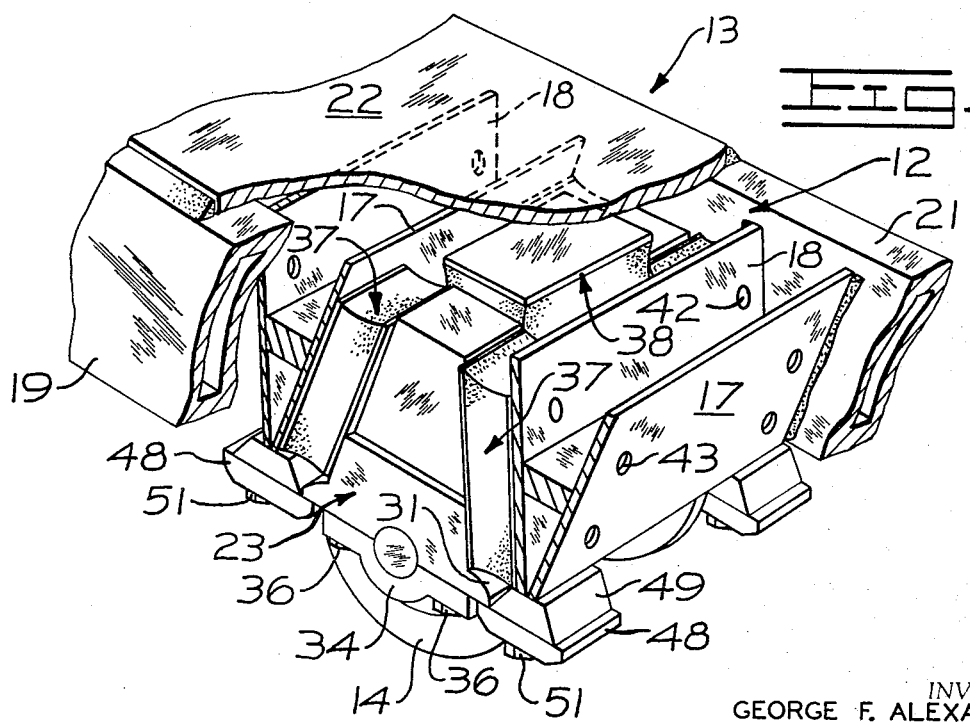
FIG. 2 is a fragmentary perspective view with portions broken away of the resilient mounting.

Referring now to FIG. 1 in detail, there is shown a tractor 11 having a plurality of longitudinally spaced track roller mounting assemblies 12 in accordance with the present invention carried by a longitudinally extending track roller frame 13 and resiliently supporting a plurality of track rollers 14 traversed by an endless track 16.

Each assembly 12 includes a pair of support plates 17 and 18 secured by welding or the like transversely between main side plates 19 and 21 of the roller frame 13. The support plates are oppositely longitudinally inclined with respect to each other to extend divergingly downward from a top plate 22 of the frame.

The leading and trailing plates 18 and 17 respectively of adjacent assemblies 12 abut each other adjacent the lower end of the frame to thereby define a V-shaped configuration. In this manner, the support plates in conjunction with the side and top plates of the frame define a longitudinal succession of bottom opening upwardly converging roller support housings, one for each mounting assembly 12.

The support housing of each assembly 12 serves to receive a support yoke 23 which is arranged to journal one of the track rollers 14 for rotation about a transverse horizontal axis.

More particularly, the yoke preferably includes a pair of parallel transversely spaced wedge shaped side members 24 interconnected adjacent their upper ends by means of a transversely extending bridge plate 26. The yoke side members are preferably relatively thick such that their oppositely inclined end edges 27 and 28 are relatively wide. Such edges are at substantially the same angles as the support plates 17 and 18 so as to be in parallel spaced relation thereto when the yoke is received in the support housing.

Figure 3:
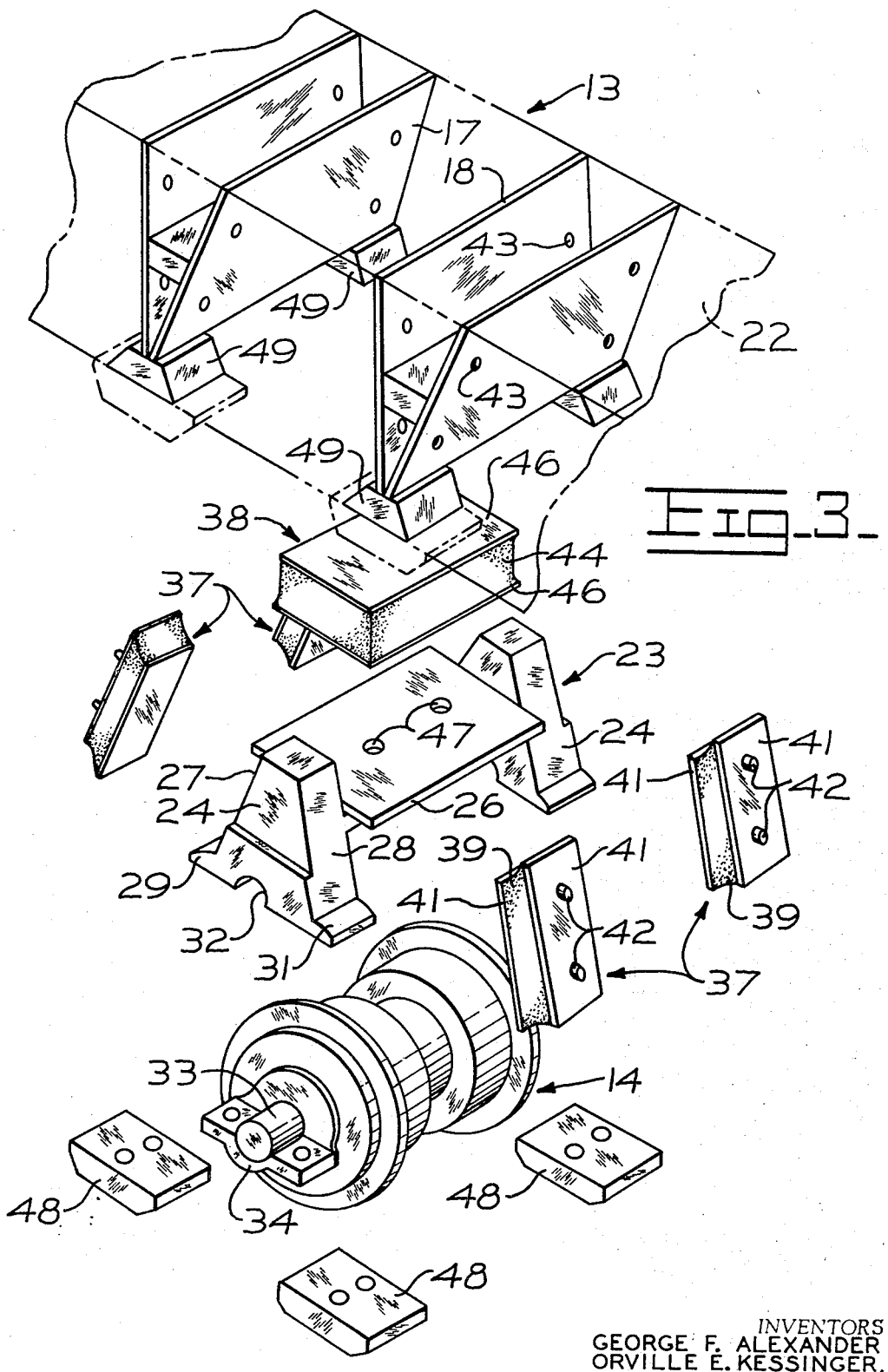
FIG. 3 is an exploded perspective view of the resilient mounting.

The bridge plate 26 is spaced downwardly from the upper ends of the side members 24, as shown in FIG. 3, for purposes subsequently described. In addition, the inclined edges of the side members are preferably formed at their base ends with outwardly flared lips 29 and 31.

To facilitate journalling of the roller 14, the bases of the side members are best centrally provided with arcuate notches 32 for receiving axle pins 33 of the roller. With the pins engaging the notches, the roller proper is journalled transversely between the yoke side members.

Retention of the roller in journalled position is then effected by means of caps 34 removably secured to the bases of the side members with bolts 36 or the like, such caps having arcuate portions bridging the notches 32 and engaging the axle pins. Consequently, removal of the roller from the assembly 12 may be easily accomplished by detaching the caps from the yoke side members.

Considering now the particularly salient aspects of the invention, it is to be noted that the yoke 23 is resiliently mounted within the support housing in a manner which affords preloading in both compression and shear of resilient mounting pads employed therein to provide cushioning.

More particularly, pairs of resilient shear and compression pads 37 are secured to the support plates 17 and 18 adjacent the opposite side edges thereof in positions to bear against the inclined edges 27 and 28 of the side members 24 of the web when same is inserted into the bottom opening of the support housing defined within the frame 13 by the support plates.

A compression pad 38 secured to the bridge plate 26 of the yoke extends beyond the upper ends of the side members 24 to bear against the top plate 22 of the frame when the yoke is in inserted position.

Each of the pads 37 is preferably formed of a rectangular block 39 of rubber with bonding plates 41 secured to the opposite major faces thereof. Dowels 42 projecting from one plate 41 of the respective pads 37 engage holes 43 provided in the support plates 17 and 18 to thereby locate such pads in position to engage the yoke side members 24.

Similarly, pad 38 is formed of a rectangular block 44 of rubber with bonding plates 46 secured to the opposite major faces thereof. One plate 46 is provided with dowels (not shown) for engaging holes 47 in the yoke bridge plate 26, thereby fixing pad 38 in position to abut the top plate 22.

To facilitate the previously noted preloading of the pads 37 and 38, means are provided to retentatively urge the yoke upwardly into the support housing within the frame 13 and thereby compress the pads 37 and 38. To these ends, provision is made to bolt retaining plates 48 to the base ends of the support plates 17 and 18 adjacent the opposite side edges thereof in positions to act upwardly against the lips 29 and 31 at the base ends of the yoke side members 24.

More particularly, mounting feet 49 are preferably secured to the base intersections of the support plates 18 and -& of adjacent support housing adjacent the opposite sides thereof. Bolts 51, or equivalent fasteners, threading taps in the feet 49 are then employed to secure the retaining plates 48 thereto, with the plates longitudinally projecting beyond the opposite ends of the feet so as to engage the lips of the yokes of two adjacent mounting assemblies 12. Upon tightening of the bolts 51, the retaining plates force the yokes upward and compress their associated pads 37 and 38. In this manner the pads are preloaded and the yokes are retained in mounted position.

With the pads 37 and 38 of a mounting assembly 12 preloaded in the manner just described, 17 will be appreciated that the yoke 23, and roller 14 thereby carried, are resiliently supported by the pads in both compression and shear. A firm mounting of the roller is provided under normal conditions while deflection is permitted under shock loads to dampen shock load vibrations. In this manner, ride characteristics of the tractor 11 are improved and vehicle service life is extended.

In addition, each roller 14 may be removed independently without disturbing its preload condition merely by removing the bolts 36 and caps 34 securing the roller to its associated resiliently mounted support yoke 23.

Although the invention has been hereinbefore described and illustrated in the accompanying drawings with respect to a single preferred embodiment, it will be appreciated that numerous modifications and changes may be made therein without departing from the true spirit and scope of the invention, and thus it is not intended to limit the invention except by the terms of the following claims.

What is claimed is:

1. A track roller resilient mounting comprising a track roller mounting frame for longitudinal securance to the body of a track laying vehicle, means defining at least one bottom opening support housing within said frame including opposed longitudinally inclined upwardly converging transverse walls, a wedge shaped support yoke comprising a pair of parallel spaced wedge shaped side members with a transversely interconnecting bridge plate therebetween, said yoke extending upwardly into each housing and including inclined edge portions in parallel spaced relation to said transverse walls, said side members each having oppositely longitudinally inclined end edges terminating at their base ends in longitudinally outwardly projecting lips, resilient pad means comprising four resilient pads respectively interposed between said end edges of said side members and said transverse walls and a fifth pad interposed between said bridge plate and upper wall of said frame, retaining plates for engagement with the base end of said yoke, and threaded fastener means securing said retaining plates to the base ends of said transverse walls to retain said housing in a position of compressive engagement with said pads, said retaining plates engaging said lips of said side members to force said yoke upwardly in said housing, a track roller journaled to each said yoke, and means for removably securing each roller to each corresponding yoke for journaled rotation about a transverse axis.

2. A mounting according to claim 1, further defined by said yoke side members having arcuate notches centrally of their base ends, said roller transversely disposed between said side members and having axle pins engaging said notches, said removable securing means including caps removably secured to the base ends of said yoke side members with arcuate portions bridging said notches.

3. A mounting according to claim 1, further defined by said pads each including a rectangular block of rubber with bonding plates secured to the opposite major faces thereof, one bonding plate of each pad having dowels projecting therefrom, the dowels of said four pads engaging holes in said transverse walls, the dowels of said fifth pad engaging holes in said bridge plate.

4. A track roller resilient mounting comprising a track roller mounting frame for longitudinal securance to the body of a track laying vehicle, means defining at least one bottom opening support housing within said frame including oppositely longitudinally inclined upwardly converging transverse walls, said transverse walls comprising oppositely longitudinally inclined support plates secured transversely between side walls of said frame and upwardly converging to a top wall of said frame, leading and trailing support plates respectively of adjacent housings converging at their base ends to define a V-shaped configuration, a wedge-shaped support yoke extending upwardly into each housing and including inclined edge portions in parallel spaced relation to said transverse walls, resilient pad means interposed between said inclined edge portions of said yoke and said transverse walls and between the top of said yoke and upper wall of said housing, retaining means including mounting feet secured to the base ends of said leading and trailing support plates of adjacent housings adjacent the sides thereof and engaging each yoke to retain same within said housing in a position of compressive engagement with said pad means, a track roller journaled to each yoke, and retaining plates bolted to said feet and longitudinally projecting beyond the opposite ends thereof to engage the base ends of the yokes disposed in adjacent housings for securing each roller to each corresponding yoke for journaled rotation about a transverse axis.

5. A mounting according to claim 4, further defined by said yoke comprising a pair of parallel spaced wedge shaped side members with a transversely interconnecting bridge plate therebetween, said side members each having oppositely longitudinally inclined side edges terminating at their base ends in longitudinally outwardly projecting lips, said pad means comprising four resilient rectangular bonded rubber pads respectively interposed between said end edges of said side members and said support plates and a fifth resilient rectangular bonded rubber pad interposed between said bridge plate and top wall of said frame, said four pads having dowels projecting therefrom and engaging holes in said support plates, said fifth pad having dowels projecting therefrom and engaging holes in said bridge plate, said retaining plates each engaging lips of the side members of two yokes disposed in two adjacent housings.

6. A mounting according to claim 5, further defined by said yoke side members of each yoke having arcuate notches centrally of their base ends, each roller transversely disposed between said side members of one of said yokes and engaging said notches, thereof, said removable securing means including caps removably secured to the base ends of said yoke side members with arcuate portions bridging said notches.

* * * * *

UNITED STATES PATENT OFFICE
CERTIFICATE OF CORRECTION

Patent No. 3,695,737        Dated  October 3, 1972

Inventor(s) GEORGE F. ALEXANDER et al

It is certified that error appears in the above-identified patent and that said Letters Patent are hereby corrected as shown below:

Column 3: line 53: delete "-&" and insert --17--.
line 65: delete "17" and insert --1t--.

Claim 3, line 1: delete "1" and insert --2--.

Signed and sealed this 8th day of May 1973.

(SEAL)
Attest:

EDWARD M. FLETCHER, JR.                ROBERT GOTTSCHALK
Attesting Officer                      Commissioner of Patents